United States Patent
Zinnaecker

(10) Patent No.: US 9,512,571 B2
(45) Date of Patent: Dec. 6, 2016

(54) DEVICE AND METHOD FOR CUTTING TO SIZE COATED DECORATIVE PAPER WEB SECTIONS AND USE OF A DEVICE

(71) Applicant: Surteco Decor GmbH, Laichingen (DE)

(72) Inventor: Knut Zinnaecker, Westerheim (DE)

(73) Assignee: Surteco Decor GmbH, Laichingen (DE)

( * ) Notice: Subject to any disclaimer, the term of this patent is extended or adjusted under 35 U.S.C. 154(b) by 0 days.

(21) Appl. No.: 14/405,006

(22) PCT Filed: Feb. 20, 2014

(86) PCT No.: PCT/EP2014/053362
§ 371 (c)(1),
(2) Date: Dec. 2, 2014

(87) PCT Pub. No.: WO2014/146856
PCT Pub. Date: Sep. 25, 2014

(65) Prior Publication Data
US 2015/0376839 A1    Dec. 31, 2015

(30) Foreign Application Priority Data
Mar. 18, 2013    (EP) .................. 13159662

(51) Int. Cl.
*D21H 23/72*    (2006.01)
*B65H 35/02*    (2006.01)
(Continued)

(52) U.S. Cl.
CPC ........... *D21H 23/72* (2013.01); *B23K 26/0846* (2013.01); *B23K 26/38* (2013.01);
(Continued)

(58) Field of Classification Search
CPC .... D21H 23/72; B23K 26/38; B23K 26/402; B26D 1/24
USPC .................................................. 162/194, 286
See application file for complete search history.

(56) References Cited

U.S. PATENT DOCUMENTS

2010/0319505 A1*  12/2010  Celeste .................... B26D 9/00
                                                                    83/39

FOREIGN PATENT DOCUMENTS

DE         202 20 537         11/2003
DE     10 2010 052 044         5/2012
(Continued)

OTHER PUBLICATIONS

International Application No. PCT/EP2014/053362 search report dated May 26, 2014.

*Primary Examiner* — Mark Halpern
(74) *Attorney, Agent, or Firm* — Bachman & LaPointe, PC

(57) ABSTRACT

A device (100) for the cutting to size of coated decorative paper web sections (5, 6), with a processing line (10) with units (11 to 13) for purposes of decorating and impregnating a continuous paper web (15) to form a decorative paper web (1), and at least one transverse cutting unit (30, 31) for purposes of cutting off decorative paper web sections (5, 6) of defined length ($l_1$, $l_2$) from the decorative paper web (1). In accordance with the invention provision is made for at least one longitudinal cutting unit (18) to be arranged ahead of the at least one transverse cutting unit (30, 31) in the direction of feed, for purposes of separating the decorative paper web (1) into at least two continuous decorative paper web lengths (2, 3), and provision is made for at least one deflection unit (25), which spaces the two decorative paper web lengths (2, 3) apart from one another and feeds each of them to a separate transverse cutting unit (30, 31).

16 Claims, 2 Drawing Sheets

(51) Int. Cl.
  *D21H 23/70*   (2006.01)
  *D21H 23/74*   (2006.01)
  *D21H 27/00*   (2006.01)
  *D21H 27/18*   (2006.01)
  *B26D 1/24*    (2006.01)
  *B26D 5/00*    (2006.01)
  *B26D 7/26*    (2006.01)
  *B26D 9/00*    (2006.01)
  *B23K 26/08*   (2014.01)
  *B23K 26/38*   (2014.01)
  *B65H 35/04*   (2006.01)
  *B23K 26/40*   (2014.01)

(52) U.S. Cl.
  CPC ............ *B23K 26/402* (2013.01); *B26D 1/245* (2013.01); *B26D 5/00* (2013.01); *B26D 7/2635* (2013.01); *B26D 9/00* (2013.01); *B65H 35/02* (2013.01); *B65H 35/04* (2013.01); *D21H 23/70* (2013.01); *D21H 23/74* (2013.01); *D21H 27/00* (2013.01); *D21H 27/18* (2013.01); *B23K 2201/16* (2013.01); *B23K 2203/40* (2015.10); *B65H 2301/4148* (2013.01)

(56) References Cited

FOREIGN PATENT DOCUMENTS

| | | | |
|---|---|---|---|
| EP | 0 236 275 | | 9/1987 |
| EP | 0771623 | * | 5/1997 |
| EP | 1 020 560 | | 7/2000 |
| WO | 2011/042047 | | 4/2011 |

* cited by examiner

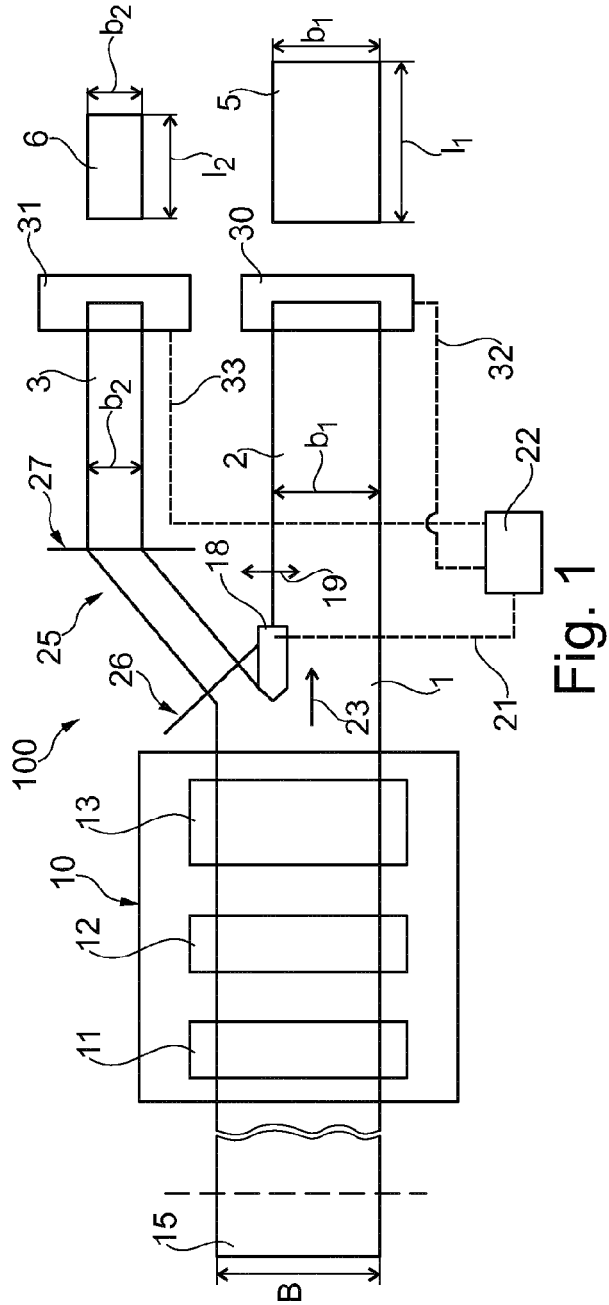
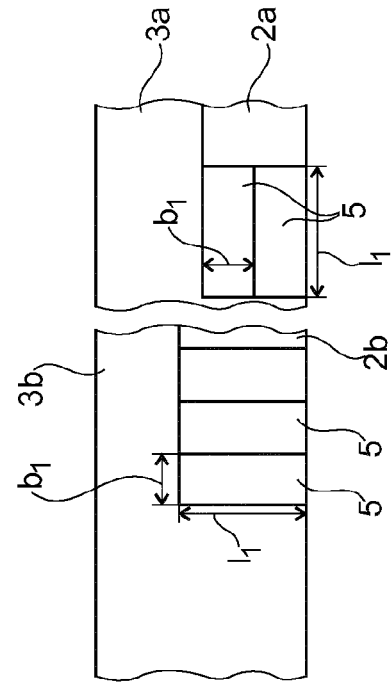
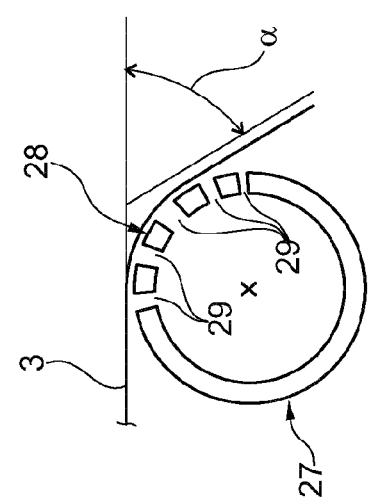

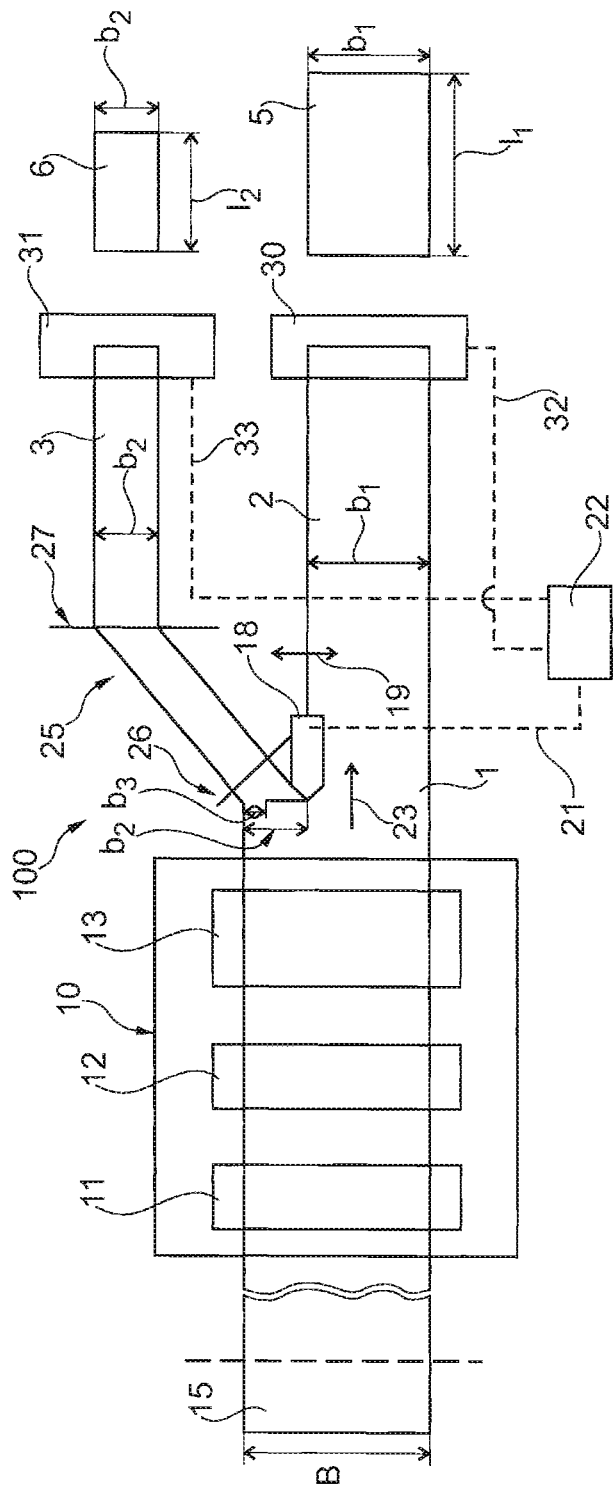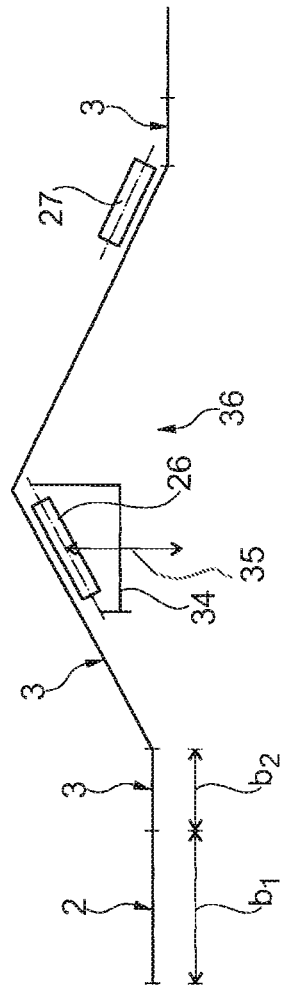
Fig. 4
Fig. 5

DEVICE AND METHOD FOR CUTTING TO SIZE COATED DECORATIVE PAPER WEB SECTIONS AND USE OF A DEVICE

This application is a 371 of PCT/EP2014/053362 filed 20 Feb. 2014.

BACKGROUND OF THE INVENTION

The invention concerns a device and a method for the cutting to size of coated decorative paper web sections. The invention furthermore concerns the use of an inventive device for the cutting to size of coated decorative paper web sections.

A device and a method for the cutting to size of coated decorative paper web sections are already of known art from practice. Here a continuous paper web is fed along a processing line, wherein the paper web runs through various processing stations. The said various processing stations comprise at least one unit for the application of decoration, in particular in the form of a printed image, onto the paper web, an impregnation unit for purposes of impregnating and/or coating the printed image, and also a transverse cutting unit, with which individual decorative paper web sections of defined length can be cut off from the decorative paper web. What is important here is that the units arranged along the processing line (for purposes of coating and impregnation, as well as additional units as necessary) are designed and set up for a maximum format for processing in terms of the width of the paper web. The devices of known art, i.e. the processing units, are indeed also provided and suitable for the purpose of enabling paper webs with a width that is reduced compared with the maximum width to be processed; in these circumstances, however, it is accepted that the respective processing stations do not operate in an optimal manner with regard to their respective efficiencies; an increased consumption of impregnation agents is, for example, accepted, which agents are not used in the impregnation of the paper web with a reduced width. This has the consequence that the manufacturing costs per unit surface area in the case of a paper web with a width that is reduced compared with the maximum width are increased with reference to those for a paper web of maximum width. This is ever more strongly the case, the narrower the paper web that is being processed is in comparison to the maximum width that can be processed.

Furthermore it is in particular also usual that when manufacturing decorative paper web sections of different widths the corresponding contracts are processed one after another on the device of known art, wherein in each case a change of format, i.e. a changeover of the paper web used, is necessary (by virtue of the different widths of the paper webs required). In particular, if the batch sizes in question are in each case relatively small, such a procedure leads to relatively high handling costs and also long downtimes on the device, which features also increase the production costs.

DISCLOSURE OF THE INVENTION

Starting from the prior art as presented, the object underlying the invention is that of developing a device and a method for the cutting to size of coated decorative paper web sections in accordance with the preambles of the two independent claims, such that the manufacturing costs for decorative paper web sections that have a reduced width compared with the design width of the processing units are reduced compared with the prior art. Furthermore the handling effort and the downtimes are to be reduced when processing different widths of paper webs.

This object is inventively achieved with a device for the cutting to size of coated decorative paper web sections with the features disclosed herein, in that at least one longitudinal cutting unit is arranged ahead of the at least one transverse cutting unit in the direction of feed for purposes of separating the decorative paper web into at least two continuous decorative paper web lengths, and in that at least one deflection unit is provided which spaces the two decorative paper web lengths apart from one another and feeds each of them to a separate transverse cutting unit.

In other words, the concept underlying the invention is that of processing as wide as possible a decorative paper web on the processing units of the processing line, in order that the processing units along the processing line can always operate at their optimal efficiencies, i.e. in the vicinity of their design points, in terms of a maximum width of decorative paper web to be processed. In the further course of the processing line such a decorative paper web, provided with a decorative pattern and impregnated, is subsequently separated in the longitudinal direction into at least two decorative paper web lengths by means of a longitudinal cutting unit, such that from the resulting decorative paper web lengths the decorative paper web sections of defined length and width can be cut off by respective transverse cutting units. By way of example, and in a non-restrictive manner, an example of embodiment is to be cited for purposes of clarification, in which two contracts for the cutting to size of decorative paper web sections are present, wherein in the one contract a paper web width of 1.50 m is required, and in the other contract a width of 1 m. The processing units on the processing line are to be set up by way of example to a maximum (design) paper web width of 3 m. In accordance with the invention therefore, a paper web of the width of 2.5 m can, for example, be processed on the inventive device, which web is separated by means of the longitudinal cutting unit into the two desired formats of 1.5 m width and 1 m width after application of the decorative pattern and impregnation. The inventive device thus enables two (different) contracts to be processed at the same time, which because of the downtime required for changing over between the two paper webs of 1.5 m width and 1 m width otherwise used not only is essentially faster, but also more economical, since the processing units on the processing line only have to process a paper web of 2.5 m width once, whereas it would otherwise be necessary to feed through two paper webs of 1.5 m width and 1 m width, whereby the processing units, when processing the paper webs that in each case are narrower in width compared with the 2.5 m paper web, are operating in a range of poorer efficiencies and increased material consumption.

Advantageous developments of the inventive device for the cutting to size of coated decorative paper web sections are also presented herein.

In a preferred configuration of the inventive device it is proposed that the at least one deflection unit is set up for the purpose of aligning the at least two decorative paper web lengths parallel to one another between the longitudinal cutting unit and the transverse cutting units. By this means a processing line that already exists is increased just in terms of its width, or, in the event that the decorative paper web lengths are arranged one above another, in terms of its height, so that machine halls that already exist can usually be equipped with the inventive device without major reconstruction and/or without a requirement for more space. With regard to the total length of such a processing plant it should also be noted that the total length as a result of the additional unit required, compared with the prior art, for purposes of longitudinal cutting of the decorative paper web, is only increased with, for example, approx. 4 m. With a typical total length for such a processing plant of between 80 m and 100 m such an additional space requirement can usually be implemented without major additional costs regarding the infrastructure in the machine hall.

In order to achieve as small a deflection angle as possible on a decorative paper web length, and thus to reduce the loading on the decorative paper web length, and on the deflection units operating together with the latter, it is preferable for provision to be made for two deflection elements to be provided that are spaced apart one another, each of which deflects a decorative paper web length through approx. 40° to 90°, preferably through 90°, from its direction of feed. Such a design for the deflection elements enables a parallel arrangement of the two decorative paper web lengths, if, in the case of two decorative paper web lengths, one of the two decorative paper web lengths is not deflected from its original direction of feed. Furthermore a variation of the spacing between the two deflection elements enables a simple adjustment to different spacings between the two decorative paper web lengths.

In a preferred design configuration of the deflection element the latter has a guide surface of curved design for the decorative paper web length, in particular on a deflection cylinder rigidly arranged on an axis, wherein in the region of the guide surface a cushion of air is formed so as to provide contact-free deflection of the decorative paper web length. In particular the use of such an air cushion, which prevents the decorative paper web length from sitting directly on the guide surface, enables a relatively long durability and/or service life for the deflection element, since as a result of the coating of the decorative paper web length the latter contains on its surface, for example, hard wear-resistant materials such as corundum, which in the event of direct contact with the guide surface would otherwise lead to rapid wear of the guide surface.

For purposes of forming the air cushion, in particular when using a deflection cylinder provision can be made for the guide surface to have openings to allow air at an elevated pressure to flow through; the openings are arranged on the side facing away from the decorative paper web length and are in operative connection with an elevated pressure source. By means of an appropriate configuration of the openings, i.e. of their shape, it is moreover possible to achieve, for example, guidance of the decorative paper web length, or an additional force in the direction of feed.

In a very particularly preferred development of the invention provision is made for the deflection unit to be designed so as to raise a decorative paper web length, cut off from the paper web and arranged, i.e. guided, parallel to, and spaced apart from, the paper web, from the plane of the paper web in a certain region in the vicinity of the deflection unit, and to lower it onto the original plane once more, such that a passage is formed in the raised region of the decorative paper web length. The background for this modification is that it is often necessary for an operator to gain access, from the region between the two decorative paper web lengths arranged in parallel, to the region at the start of the machine line, so as there to undertake, for example, inputs to the machinery, or similar. The proposed modification enables the decorative paper web length arranged parallel to the original paper web not only to be deflected from the original direction of the paper web, but at the same time to be raised in the form of a bridge, so that an operator can, on the one hand, remain or move between the two decorative paper web lengths, and on the other hand, can gain access by the shortest possible route to the start of the machine line by crossing under through the passage formed by the raised deflection unit, without having to run around the end of the machine line. In particular by this means it is possible, as a result of the optimised, i.e. shortened routes, to introduce appropriate measures as quickly as possible in the event of disruptions to production, so that repair costs and/or the consumption of decorative paper web lengths that cannot be used are reduced.

In a design configuration of the height-adjustable deflection unit provision is made that, for purposes of adjusting the height of the decorative paper web length, a deflection element facing towards the paper web is designed to be adjustable in height. It is thus sufficient for just a single element of the deflection unit to be of a height-adjustable design, so as to form the passage provided during production for the operating personnel.

Very particularly preferable is furthermore a configuration of the inventive device in which the at least one longitudinal cutting unit and the at least one deflection unit are arranged such that they can be adjusted in a direction transverse to the longitudinal direction of the decorative paper web. Such a design in particular enables the device to be adjusted to different widths of the decorative paper web lengths. Usually such an adjustment takes place with the aid of electric motors, or pneumatic or hydraulic means, by data input on an operator control module, or a control panel. Here in particular provision can be made for the longitudinal cutting unit and the at least one deflection unit to be connected with one another (in control terms) such that an automatic adjustment of the deflection unit takes place as a function of the position of the longitudinal cutting unit.

A further element of the invention consists in an optimisation of the format of the processed decorative paper web such that the longitudinal cutting unit and the transverse cutting units are operated so as to cut the individual decorative paper web sections from the decorative paper web lengths such that as little waste occurs as possible, i.e. such that the decorative paper web can be used as completely as possible for purposes of manufacturing decorative paper web sections with appropriate formats. To this end provision is made for the device to comprise control means, which are designed for the purpose of adjusting the at least one longitudinal cutting unit in its position on the basis of the format of the decorative paper web and the decorative paper web sections, and for the purpose of controlling the transverse cutting units such that an optimisation of the decorative paper web takes place in the sense of a generation of decorative paper web sections that is as complete as possible and free of waste.

In a particular configuration of the control means provision can be made for the control means to comprise storage means with formats and combinations of formats of decorative paper web sections. This means that a very wide variety of decorative paper web sections are saved in a storage unit of the device; these are compared with the format of the paper web that is to be processed such that by means of an optimised arrangement of the decorative paper web sections (oriented longitudinally or transversely with respect to the paper web, i.e. to the decorative paper web length) optimisation is achieved in the sense of as little waste as possible.

The inventive method for the cutting to size of coated decorative paper web sections with the features of the independent claim is distinguished in that in a region ahead of the at least one transverse cutting unit the decorative paper web is cut into at least two continuous decorative paper web lengths by means of at least one longitudinal cutting unit, and in that the at least two decorative paper web lengths are fed to separate transverse cutting units.

In a preferred development of the inventive method it is proposed that the width of the decorative paper web in the region of the processing line is at least 50%, preferably more than 75%, particularly preferably at least 90%, of the design width of the units on the processing line. Such a method enables cost optimisation in the manufacture of the decorative paper web sections, since the processing units operate in the region of high efficiency, and the consumption of consumables can be minimised with respect to the surface area to be processed.

In order to avoid the necessity for buffer sections for intermediate storage of the decorative paper web lengths between the longitudinal cutting unit and the associated transverse cutting units, it is moreover proposed that the decorative paper web lengths are fed continuously between at least the longitudinal cutting unit and the associated transverse cutting units. Such a continuous feed process also reduces moreover the mechanical loading on the decorative paper web lengths, since in comparison to a cyclical feed process the latter are not accelerated or retarded, and thus can always have a constant web tension.

The feeding of a decorative paper web length cut off from the paper web to the deflection unit, depending upon the width of the decorative paper web length that has been cut off, can be difficult inasmuch as the cut-off decorative paper web length is relatively sensitive in terms of mechanical handling. Here in particular the forces acting on the cut-off decorative paper web length during deflection and introduction into the region of the deflection unit must be sufficiently small such that no damage occurs to the cut-off decorative paper web length. If an attempt were to be made to feed the cut-off decorative paper web length into the deflection unit with what was intended to be its final width from the start, the handling of what on occasion would be a relatively wide decorative paper web length would be relatively difficult for an operator, and in particular forces could act on the decorative paper web length that were too high and damaging to the latter. Therefore in a particularly preferred configuration of the method provision is made, at a point in time ahead of a production phase, during a setting-up phase for the longitudinal cutting unit, for the width of the decorative paper web length, cut-off from the paper web and deflected, to be continuously increased from an initial value greater than zero up to the intended final width. Pictorially speaking this means that a wedge-shaped section of the decorative paper web length is fed through the deflection unit until the final width of the cut-off decorative paper web length is achieved. Such a formation of a wedge-shaped section of the decorative paper web length enables on the one hand the starting section, which has a relatively small width, to be fed by an operator into the deflection unit in a relatively simple manner, wherein in the further course of events the width of the decorative paper web length is continuously increased up to the final value, and wherein the forces acting on a decorative paper web length are likewise continuously increased in an even manner, so that any damage to the decorative paper web length can be avoided.

Although in the context of the following description just two decorative paper web lengths are assumed, which are formed from one decorative paper web by means of longitudinal cutting, the invention also comprises applications in which more than two decorative paper web lengths are generated from one decorative paper web. In practice this means that such a device has, for example, two longitudinal cutting units, if three decorative paper web lengths are to be created from one decorative paper web. Furthermore an application is also conceivable in which, for purposes of cost optimisation three decorative paper web lengths are, for example, generated in order to be able to use an existing paper web format in an optimal manner, a relatively narrow decorative paper web length is, however, created as waste, which in some circumstances is more economical than using a special format for the manufacture of two decorative paper web lengths. This is a function of the application in each case. In the last cited variant two longitudinal cutting units are likewise necessary, wherein the waste is cut off from the decorative paper web length in the form of a strip by means of a second longitudinal cutting unit.

In accordance with the invention the device and the method find application in the creation of decorative webs for subsequent lamination onto furniture materials or floor coverings.

BRIEF DESCRIPTION OF THE DRAWINGS

Further advantages, features, and details of the invention ensue from the following description of preferred examples of embodiment, and by means of the figures.

In the latter:

FIG. 1 shows a schematic representation of an inventive device for the cutting to size of coated decorative paper web sections.

FIG. 2 shows a section through a deflection unit for a decorative paper web length, as is used in a device in accordance with FIG. 1, FIG. 3 shows in plan view a representation of a decorative paper web for purposes of explaining the arrangement of different formats of decorative paper web sections, FIG. 4 shows a schematic representation of a device that has been modified compared with FIG. 1, and FIG. 5 shows a section through a device that has again been modified compared with FIGS. 1 and 4 in the vicinity of a height-adjustable deflection unit.

The same elements, or elements with the same function, are allocated the same reference symbols in the figures.

DETAILED DESCRIPTION

In FIG. 1 a device 100 for the cutting to size of coated decorative paper web sections 5, 6 is represented in a greatly simplified manner. The decorative paper web sections 5, 6 have, for example, different lengths $l_1$ and $l_2$ and also different widths $b_1$ and $b_2$. The decorative paper web sections 5, 6 are created from decorative paper web lengths 2, 3, which have the corresponding widths $b_1$ and $b_2$ respectively. The decorative paper web lengths 2, 3 are in turn 1 generated from a decorative paper web 1. For this purpose the device 100 has, for example, a plurality of processing units 11, 12, 13 along a processing line 10, for purposes of decorating and impregnating a continuous paper web 15 stocked as a roll of width B, wherein the width B of the paper web 15 corresponds to the sum of the widths $b_1$ and $b_2$ of the decorative paper web lengths 2, 3. The paper web 15, i.e. the decorative paper web 1 and the decorative paper web lengths 2, 3, are continuously fed onto the device 100 by means of conveyor units; the latter are of known art per se and are therefore not represented.

Onto the end of the processing line 10, i.e. the last processing unit 13, is connected a longitudinal cutting unit (18), which separates the decorative paper web 1 into the two decorative paper web lengths 2, 3.

The longitudinal cutting unit 18 preferably takes the form of two cutting wheels rotating concurrently, or one laser beam cutting unit. For purposes of generating different widths $b_1$ and $b_2$ of the decorative paper web lengths 2, 3 the longitudinal cutting unit 18 can be adjusted in the direction of the double arrow 19 transverse to the longitudinal direction of the decorative paper web 1, and is for example connected via an adjustment drive and an electrical line 21 with a control unit 22 of the device 100.

While the one decorative paper web length 2 is not deflected from its original direction of feed in the direction of the arrow 23, but rather is conveyed onwards in a straight line, the other decorative paper web length 3 is deflected by means of a deflection unit 25 from its original direction, such that the decorative paper web length 3 is conveyed onwards parallel to the decorative paper web length 2. To this end the deflection unit 25 comprises two deflection cylinders 26, 27, which are only schematically represented in FIG. 1; of these two, the second deflection cylinder 27 in the direction of feed is represented in more detail in FIG. 2.

The two deflection cylinders 26, 27 are designed as rigidly arranged cylinders and in each case deflect the decorative paper web length 3 through an angle $\alpha$ of approx. 40° to 90°, preferably in each case through 90°, from its respective direction of feed. For this purpose the deflection cylinder 27 has a guide surface 28, which is designed as the surface skin of the deflection cylinder 27, and in which openings 29 are provided in the region that is in active contact with the decorative paper web length 3; these openings are exposed to air at an elevated pressure from a source of elevated pressure that is not represented; the air forms an air cushion, which cannot be discerned in FIG. 2, between the guide surface 28 and the decorative paper web length 3, such that the decorative paper web length 3 does not make contact with the guide surface 28.

Both decorative paper web lengths 2, 3 then enter into the region of two transverse cutting units 30, 31, which can be activated individually and are set up for the purpose of generating decorative paper web sections 5, 6 of different lengths $l_1$ and $l_2$ respectively. Furthermore both transverse cutting units 30, 31 are also connected via electrical lines 32, 33 with the control unit 22, and can be controlled by the latter.

The control unit 22 serves not only to control and position the longitudinal cutting unit 18 and the transverse cutting units 30, 31, but furthermore preferably has a program, or alternatively stored data, in order to position and/or orient the individual decorative paper web sections 5, 6 on the respective decorative paper web lengths 2, 3 such that production of decorative paper web sections 5, 6 is enabled with as little waste as possible. In this regard reference is made to FIG. 3, from which it can be discerned that a decorative paper web section 5 of width $b_1$ and length $l_1$ is possible either as a result of arranging two decorative paper web sections 5 side-by-side in the longitudinal direction, or side-by-side in the transverse direction. Here the decorative paper web length 2a or 2b has a width of either $2 \times b_1$, or $l_1$. Depending upon which format is to be processed on the second decorative paper web length 3a, 3b, the control unit 22 decides which of the two arrangements of the decorative paper web sections 5 is practical so as to generate as little waste as possible in total on the two decorative paper web lengths 2a, 2b, 3a, 3b, i.e. so as to be able to generate as many decorative paper web sections 5, 6 as possible.

In FIG. 4 it can be discerned that the longitudinal cutting unit 18, in terms of the transverse extent of the paper web 15, has reached its final position in which the decorative paper web length 3 has the width $b_2$. Provision is made during a setting-up phase for the device 100 for the longitudinal cutting unit 18 to be traversed continuously from an initial position transverse to the extent of the paper web 15 into the final position in which the width $b_2$ is reached, which is the width that is present in the production phase, In particular, in the first instant of the setting-up phase the longitudinal cutting unit 18 has a position in which a decorative paper web length 3 is generated, which has a width $b_3$, which on the one hand is greater than zero, and on the other hand is less than $b_2$.

Starting from this position of the longitudinal cutting unit 18 the latter is traversed in the direction towards a position, during which the width of the decorative paper web length 3 is continuously increased up to the width $b_2$. By this means a wedge-shaped decorative paper web length 3 is generated during the setting-up phase, which length can be particularly simply and easily introduced by an operator into the region of the deflection unit 25, wherein at the same time the forces acting on the decorative paper web length 3 are sufficiently low for any damage, such as a deformation or a tear in the decorative paper web length 3, to be avoided.

In FIG. 5 a further modification of the device 100 is represented, in which the one deflection cylinder 26 of the deflection unit 25 is arranged, i.e. attached, to a frame 34, which is arranged such that it can be adjusted vertically in the direction of the double arrow 35. Here the adjustment of the frame 34 preferably takes place by means of at least one electrically operated servomotor.

After the decorative paper web length 3 in accordance with the above remarks has achieved its final width $b_2$ and the production phase can therefore commence, the frame 34 is then raised out of the plane of the paper web 15 so that a passage 36 is created underneath the decorative paper web length 3 in the region of the deflection unit 25 between the two decorative paper web lengths 2, 3; an operator can cross under through this passage without any difficulty. Since it is just the one deflection cylinder 26 that is raised, the return of the decorative paper web length 3 once more to the level of the paper web 15, i.e. to the level of the other decorative paper web length 2, takes place via the other deflection cylinder 27.

The device 100, insofar as it has been described, can be varied, i.e. modified, in many ways without deviating from the concepts of the invention.

The invention claimed is:

1. A device (100) for the cutting to size of coated decorative paper web sections (5, 6) with a processing line (10) with units (11 to 13) for purposes of decorating and impregnating a continuous paper web (15) to form a decorative paper web (1), and at least one transverse cutting unit (30, 31) for purposes of cutting off decorative paper web sections (5, 6) of defined length ($l_1$, $l_2$) from the decorative paper web (1), wherein,
in the direction of feed ahead of the at least one transverse cutting unit (30, 31) at least one longitudinal cutting unit (18) is arranged for purposes of separating the decorative paper web (1) into at least two continuous decorative paper web lengths (2, 3), wherein at least one deflection unit (25) is provided which spaces the two decorative paper web lengths (2, 3) apart from one another and feeds each of them to a separate transverse cutting unit (30, 31), and wherein the deflection unit

(25) is designed so as to raise a decorative paper web length (3), cut off from the paper web (15) and arranged parallel to, and spaced apart from, the paper web (15), from the plane of the paper web (15) in a certain region in the vicinity of the deflection unit (25), and to lower it onto the original plane once more, such that a passage (36) is formed in the raised region of the decorative paper web length (3).

2. The device in accordance with claim 1, wherein, the at least one deflection unit (25) is set up for the purpose of aligning the at least two decorative paper web lengths (2, 3) parallel to one another between the longitudinal cutting unit (18) and the transverse cutting units (30, 31).

3. The device in accordance with claim 2, wherein, the at least one deflection unit (25) has two deflection elements (26, 27) spaced apart from one another, which in each case deflect one decorative paper web length (3) through approx. 40° to 90° from its direction of feed.

4. The device in accordance with claim 3, wherein, the deflection element (26, 27) has a guide surface (28) of curved design for the decorative paper web length (3) on a deflection cylinder rigidly arranged on an axis, and wherein, in the region of the guide surface (28), a cushion of air is formed so as to provide contact-free deflection of the decorative paper web length (3).

5. The device in accordance with claim 4, wherein, the guide surface (28) has openings (29) to allow the throughflow of air at an elevated pressure; the openings (29) are arranged on the side facing away from the decorative paper web length (3) and are in operative connection with an elevated pressure source.

6. The device in accordance with claim 3, wherein the at least one deflection unit (25) deflects one decorative paper web length (3) through 90°.

7. The device in accordance with claim 1, wherein, for purposes of height adjustment of the decorative paper web length (3) a deflection element (26) facing towards the paper web (15) is designed so as to be adjustable in height.

8. The device in accordance with claim 1, wherein the at least one longitudinal cutting unit (18) and the at least one deflection unit (25) are arranged such that they can be adjusted in a direction transverse to the longitudinal direction of the decorative paper web (1).

9. The device in accordance with claim 1, wherein control means (22) are provided, which are designed for the purpose of adjusting the at least one longitudinal cutting unit (18) in its position on the basis of the format of the decorative paper web (1) and the decorative paper web sections (5, 6), and for the purpose of controlling the transverse cutting units (30, 31) such that an optimisation of the decorative paper web (1) takes place in the sense of a generation of decorative paper web sections (5, 6) that is as complete as possible and free of waste.

10. The device in accordance with claim 9, wherein the control means (22) comprise storage means with combinations of formats of decorative paper web sections (5, 6).

11. A method for the cutting to size of coated decorative paper web sections (5, 6), in which along a processing line (10) a continuous paper web (15) is firstly decorated and impregnated, and subsequently decorative paper web sections (5, 6) of defined length ($l_1$, $l_2$) are cut off from a decorative paper web (1) by means of at least one transverse cutting unit (30, 31), wherein, in a region ahead of the at least one transverse cutting unit (30, 31) the decorative paper web (1) is separated into at least two continuous decorative paper web lengths (2, 3) by means of at least one longitudinal cutting unit (18), and wherein the at least two decorative paper web lengths (2, 3) are fed to separate transverse cutting units (30, 31), and wherein a deflection unit (25) spaces the two decorative paper web lengths (2, 3) apart from one another and feeds each of them to a separate transverse cutting unit (30, 31).

12. The method in accordance with claim 11, wherein the width (B) of the decorative paper web (1) in the region of the processing line (10) has at least 50%, of the design width of the units (11 to 13) on the processing line (10).

13. The method in accordance with claim 12, wherein the width (b) of the decorative paper web (1) in the region of the processing line (10) has more than 75% of the design width of the units (11 to 13) on the processing line (10).

14. The method in accordance with claim 12, wherein the width (b) of the decorative paper web (1) in the region of the processing line (10) has at least 90% of the design width of the units (11 to 13) on the processing line (10).

15. The method in accordance with claim 11 wherein, the decorative paper web lengths (2, 3) are fed continuously between at least the longitudinal cutting unit (18) and the associated transverse cutting units (30, 31).

16. The method in accordance with claim 11, wherein at a point in time ahead of a production phase, during a setting-up phase for the longitudinal cutting unit (18), the width of the decorative paper web length (3), cut off from the paper web (15) and deflected, is continuously increased from an initial value ($b_3$) greater than zero up to the intended final width ($b_2$).

* * * * *